June 22, 1965 G. H. WEATHERSBY 3,190,373
METHOD AND APPARATUS FOR PLUGGING WELLS
Filed Aug. 22, 1962 2 Sheets-Sheet 1

INVENTOR.
GERALD H. WEATHERSBY
BY *Hall & Houghton*
ATTORNEY

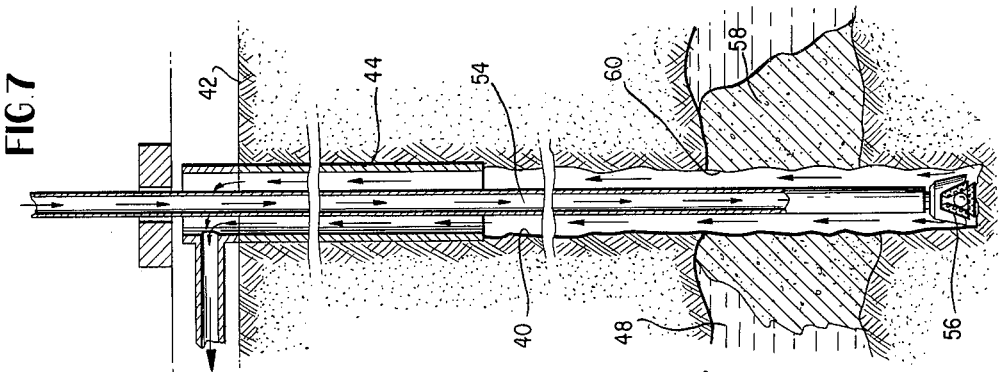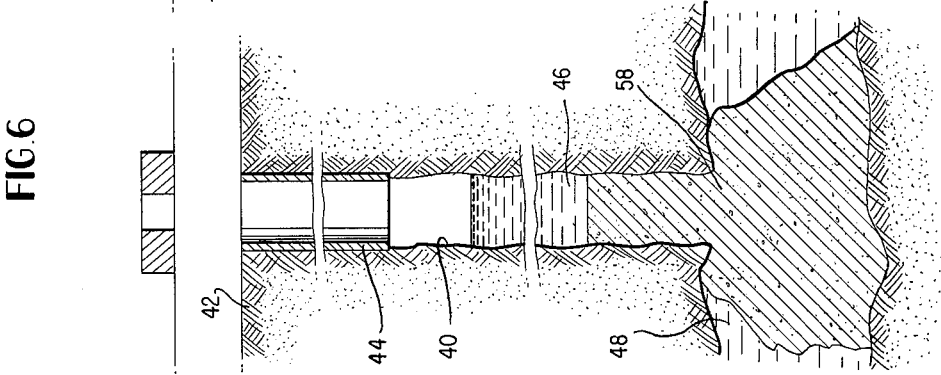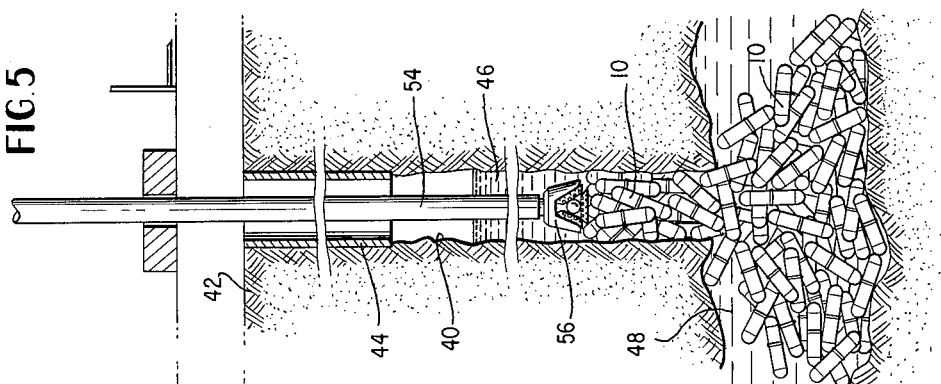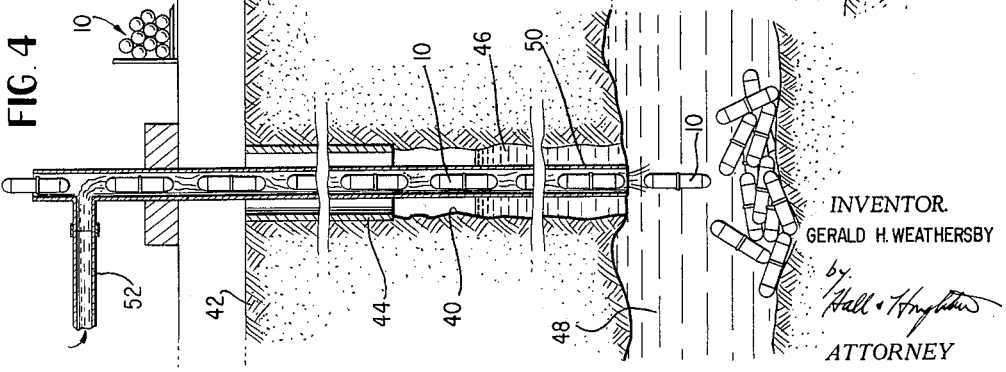
INVENTOR.
GERALD H. WEATHERSBY
ATTORNEY

United States Patent Office 3,190,373
Patented June 22, 1965

3,190,373
METHOD AND APPARATUS FOR
PLUGGING WELLS
Gerald H. Weathersby, 408 W. Forrest, Victoria, Tex.
Filed Aug. 22, 1962, Ser. No. 218,689
10 Claims. (Cl. 175—72)

The present invention relates generally to the plugging of wells being drilled, and, more particularly, to a method of, and apparatus for, plugging lost circulation zones during the drilling of wells, as well as for correcting other problems of a similar nature.

When a well is being drilled, drilling fluid is often used and is pumped through the hollow drill pipe under pressure in order to clean the bit of cuttings and to carry these cuttings up through the bore opening on the outside of the drill pipe to the surface where it may be screened, treated, and sent to the pumps for recycling.

Frequently, a "lost circulation" problem is encountered. Lost circulation means that a porous or cavernous zone has been encountered which the drilling fluid enters under less pressure than is required to bring the fluid back to the surface for treating and recycling. When this occurs the amount of fluid decreases and this renders it necessary to increase the volume of fluid being used. This is usually very costly and sometimes impossible due to the shortage of water or other materials.

Accordingly, these lost circulation zones must be plugged or filled before drilling can be properly continued. In the past a lost circulation material was included in the drilling fluid when a lost circulation problem was encountered so that, as the fluid containing the material passes through or enters the trouble zone, the material gathers on the walls of the trouble zone to such an extent that they are sealed to again attain full circulation.

However, in some instances this would not be sufficient to seal the trouble zone and in such cases attempts are made to cement the zone. In this type of method the cement must be mixed at the surface with costly mixing equipment and then pumped through the drill string to the zone where the lost circulation is encountered. After cement has been pumped into the pipe it is necessary to displace the cement with mud or water to prevent the cement from hardening in the pipe and to position the cement at the desired location in the hole. Methods of this type often fail because the cement mixture must be sufficiently thin so that it can be pumped and so that it will not set prematurely.

Other methods are available, but in all of these the mixing is costly and must be performed at the surface near the drilling site.

In one attempt to solve this problem, coated pellets have been proposed. These pellets are of a lost circulation material coated with a soluble material. The pellets are formed with a permanent coating of the soluble material thereon which is actually coated onto a core of the lost circulation material. These pellets are sufficiently small as to be carried by the stream of circulation fluid and are very expensive to manufacture, the cost being comparable to coated pills of various types which are used for medical purposes.

Due to the limitations accompanying the small size thereof for the purpose of permitting them to be carried by the drilling fluid and through the openings in the drill bit, these pellets are only slightly more effective than the lost circulation material which is dispersed throughout the circulation fluid. That is, these pellets would be suitable for filling openings slightly larger than those used in the method wherein the circulation material is placed directly into the circulation fluid. However, they are not at all suitable, nor are any of the methods mentioned above suitable for plugging large openings such as those caused by caverns or the like which are measured in terms of feet rather than in fractions of inches. Furthermore, the use of pellets occasionally causes plugging at the tool joints and particularly at the drill bit, and when this occurs the cement sets in the drill before the string can be removed from the hole for unplugging, and thus difficulties are created.

Because of the construction thereof, these pellets must be manufactured at a special plant built for the purpose and then be shipped to the site of the drilling. Because of the small percentage of moisture contained in cement, or any other material which is supposed to be a dry mixture, it is doubtful that these pellets would remain in good condition for prolonged periods of storage. These pellets thus create some difficulties since in some instances they would have to be shipped as much as two years in advance of their anticipated use.

Furthermore, due to the size and the manner in which they are placed in the hole, i.e., being carried by the circulation fluid, it is not possible to provide a sufficient amount of sealing agent into the hole to seal large openings when they exist. Accordingly, these pellets are only suitable for permeable formations or those where small fractures are encountered and could not at all be used for carrying wet mixtures or paste, or for bridge plugs or for plugging up abandoned wells or the like.

With these defects of the prior art in mind, it is a main object of the present invention to provide apparatus for and a method of preventing lost circulation even when caused by large cavernous types of openings.

Another object is to provide a device of the character described which can be assembled for the problem encountered, on the site where it is to be used, in a very simple manner, and may be adjusted in size depending upon the particular difficulty at hand.

A further object of this invention is to provide an apparatus of the type described which can be stored in a relatively small amount of space.

Still another object is to provide a method and apparatus of the type described which may be used for carrying wet mixtures.

These objects and other ancillary thereto are accomplished according to preferred embodiments of the invention wherein a three part casing is provided of soluble material, the casing including a cylindrical center portion, and two end portions generally circular in nature and which are threadedly engaged with the cylindrical portion. These soluble casings can be filled at the surface with any available or desired lost circulation material and can be immediately placed into the hole after first removing the drill string. Thus, there is no need for storing the mixtures for long periods of time and since various sizes can be retained at the drilling site, they are available for any problem which may have to be encountered.

Additional objects and advantages of the present invention will become apparent upon consideration of the following description when taken in conjunction with the accompanying drawings in which:

FIGURE 4 is a view similar to FIGURE 3 but indicating the casings being inserted into the hole.

FIGURE 5 is a view similar to FIGURE 3 indicating compression of the casings in the hole and the blocking of the cavern.

FIGURE 6 is a view similar to FIGURE 3 indicating the lost circulation material in a hardened condition and indicating how lost circulation is prevented.

FIGURE 7 is a view similar to FIGURE 3 illustrating how the drilling then continues.

Figure 1:
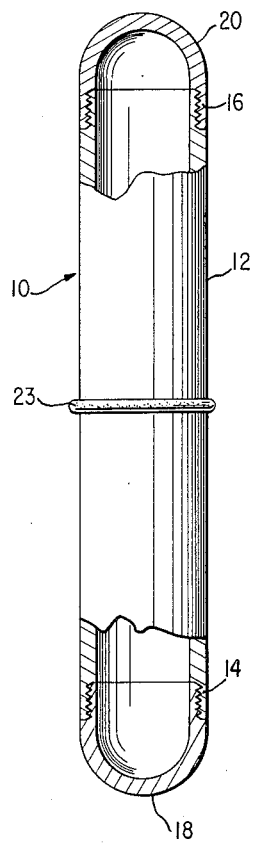
FIGURE 1 is a side elevational view partly in section indicating a completed casing adapted to contain a lost circulation material therein.

With more particular reference to the drawings, FIGURE 1 illustrates a typical casing which may be constructed in any size which is desired, and typical sizes would be from two feet to eight feet in length. Each of the casings 10 includes a central hollow cylindrical section or portion 12 which is threaded at its ends 14 and 16 with internal and external threads respectively, and a pair of closure members, which are rounded caps 18 and 20 having external and internal threads respectively, are fastened to the cylindrical center 12 by threaded engagement with ends 14 and 16. Thus, a capsule or casing assembly 10 is formed wherein the ends are threadedly secured thereon.

These elements 12, 18, and 20 are formed of a suitable soluble material and such materials are known. Then, a lost circulation material can be used as a filler and filling may be performed either on the drilling site or previously thereto, the preferable method being on the drilling site, at which time one of the caps may be removed and the filler poured into the casing and the cap then secured thereon. Each casing is provided with at least one rubber ring 23 which surrounds the center portion thereof.

Examples of suitable fillers are: bentonite and slow or quick set cement; jet flakes, cement, Fibertex, and bentonite; cement having 5 to 25% Calseal; conventional cement; various forms of rubber; hemp; and other suitable and known materials.

Materials of which the casing can be constructed are known and they can be varied in order to control the time which is required for them to dissolve. In some instances the tube or casing should dissolve after the setting time of the cement or other lost circulation material and in other cases before the setting time of the cement, dependent upon the prevailing conditions. As for the filler of cement, for example, the setting time thereof can be controlled with Calseal or other quick setting agents.

Since several size casings may be used on any site, several can be stored one inside the other or several small ones within a larger one and this will save space for shipping and simplify handling before they are actually used. It should be noted that the sizes of these casings or containers are sufficiently large to provide a sufficient volume of filler material to prevent its being permatuerly dispersed, to assure that it becomes effective before it can be and is carried away by water flow in large caverns.

The lengths and diameters of the casings are determined by the size of the hole and the nature of the zone, the size of the lost circulation zone, and various other conditions. They may vary in size from one inch to twenty inches in diameter and lengths of four inches to five or even eight feet, although in the specific example to be discussed they are about two feet in length.

Figure 2:
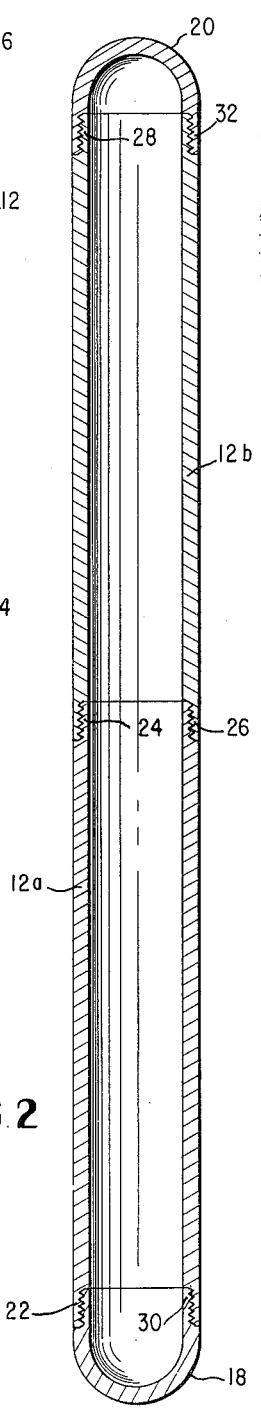
FIGURE 2 is a sectional view of a longer casing formed by joining two center sections.

Assuming the casing or capsule shown in FIGURE 1 has a center section 12 which is substantially two feet in length, but that longer capsules are required, then this may be solved by threading together two center sections 12a and 12b. Section 12a is internally threaded on one end at 22 and is externally threaded on the other end at 24. Similarly, section 12b is internally threaded on one end at 26 and is externally threaded on the other end at 28. Now sections 12a and 12b can be threadedly connected with with their threaded portions 24 and 26 (FIG. 2).

A cap 18 externally threaded at 30 is engaged with threads 22 of section 12a. Also, cap 20 which is internally threaded at 32 is engaged with threads 28 of section 12b and a capsule four feet long is provided. By using three or four center sections, capsules six or eight feet long may be formed.

Generally, in practice, when the lost circulation is discovered, the drill string is removed from the hole and the bit is detached. The open end of the pipe is then placed back into the hole at a point above the trouble zone and a small stream of mud or water is discharged in the open upper end. The casings of the present invention which are filled with a suitable filler are placed into the open end of the pipe along with the mud or water and are dropped through the pipe at short intervals to allow a small amount of fluid to be between each two adjacent casings, as they fall through the pipe, in order to prevent the casings from being lodged in the pipe before they reach the bottom.

As the tubes reach the bottom they will wedge one against the other and fill the hole in a closely knit pattern until a sufficient amount has been placed in to fill the hole above the trouble zone. As the tubes begin to dissolve they will become soft and bind together more securely. Eventually, the mixture or filler will become wet as the casings dissolve to the point of disintegrating and they will bind together and expand so that the mixture will extend outwardly onto the walls a sufficient amount to provide a sealed wall even after the hole has been opened up when drilling is resumed.

Where cavities are encountered it is sometimes necessary to use various size casings in the holes so that a portion of or some of them may enter the cavity a sufficient amount to give strength to a new wall to be built.

As these large capsules or casings are dropped, they block up the mouth of the opening causing the formation of what may be considered comparable to a log jam, and as the dissolving takes place the cement or other filling material forms a solid block. As the casings are dissolved the cement becomes exposed to the water and it may appear that the cement or other filler should be washed through the opening, but at this point the volume of material must be taken into consideration. The cement forms a solid mass which is more compact than cement that is mixed and pumped into place. On occasion it is helpful to pump mixed cement on top of the casings a predetermined period of time after they have been in place and before the capsules finish dissolving.

Figure 3:
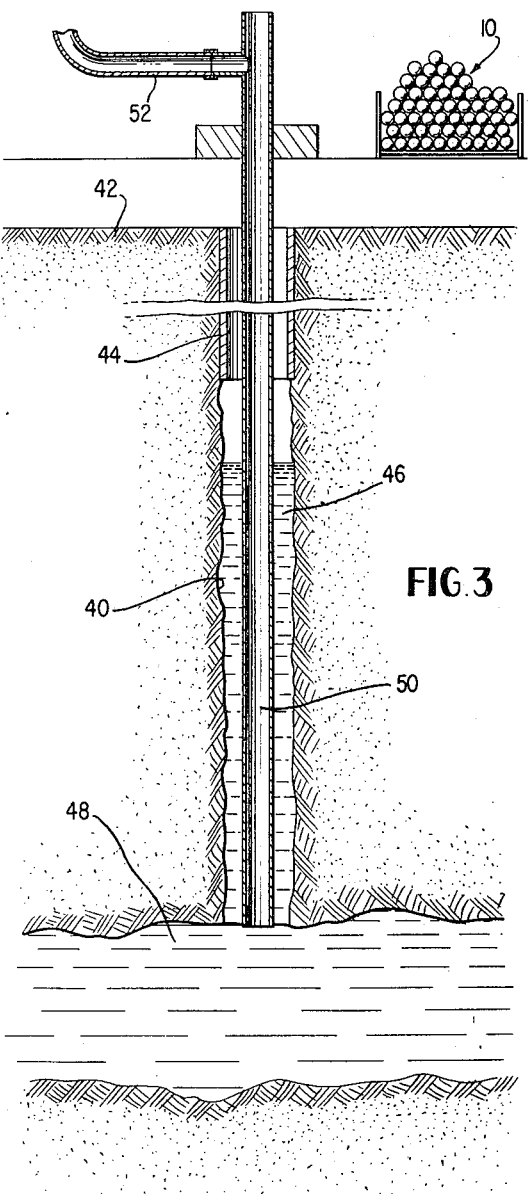
FIGURE 3 is a sectional view through a hole in the ground which is being drilled and indicating a lost circulation zone.

A specific example of the present invention will now be considered in detail in conjunction with FIGURES 3 through 7. As shown in FIGURE 3, a hole 40 has been drilled in the ground 42. A surface casing 44 is provided for the first 900 feet. After drilling to a depth of 2,000 feet the bit suddenly drops 10 feet and the circulation fluid 46 no longer returns to the surface. The driller at this point after investigation realizes that the drill bit has passed into a cavern 48 which is approximately 10 feet high.

The bit is pulled up into the surface casing. At this point, if the typical type of lost circulation material is used with the circulation fluid or even if the aforementioned pellets are used, they will simply be lost in the huge cavern. Therefore, the drill string is removed and a string of drop pipe of 6 inch diameter 50 is placed into the hole to the depth of 2,000 feet. If desired, the bit can be removed and the drill pipe can be used as the drop pipe. During the time the pipe is being obtained and preparations made to run it into the hole, 200 capsules are filled with common cement having 10% calseal and 10% bentonite. The capsules are filled from a dry bulk cement truck where the cement has been placed for mixing.

The time required for dissolving of the capsules is 12 hours which in the particular problem involved is considered necessary to complete the job before they would begin to dissolve. Since the cavity is known to be 10 feet in height, 30 capsules eight feet in length are used, the eight foot capsules being designed to fall into the cavity and not stand up in the hole above the cavity. These 30 eight foot long capsules form a partial log jam effect in the cavity as a background for the shorter capsules, dropped at a later time. The eight foot capsules are formed using four two foot capsule centers which are threaded together and the caps are screwed on the ends thereof. In a similar manner 50 four foot capsules can be used and 100 two foot capsules. These are all, in the meantime, placed on the rig floor to avoid any delay after the drop pipe is placed into the hole.

The lower end of the pipe is placed down to just above 2,000 feet and is open at the top and a hose 52 is provided for discharging a small continuous stream of fluid into the pipe 50 as the capsules 10 are being dropped, for the purpose described above to prevent the capsules from coming into contact with each other and causing a jam in the pipe and also to space them apart. Pumping under pressure is not necessary since the fluid level in the hole remained at 1,000 feet and when the volume was added inside the pipe it was cleared by the fluid seeking this level.

30 eight foot long capsules 10 are dropped into the pipe 50 manually and enough fluid volume then pumped into the pipe to assure complete displacement. The six inch pipe 50 is shown in FIGURES 3 and 4. After 30 of the eight foot long capsules are dropped the pipe 50 is lowered to determine whether or not the capsules 10 have remained in the cavity at the vicinity of the cavern 48 or have washed too far into the cavern. When the pipe is lowered it may be found that it makes contact after being lowered five feet to 2,005 feet so that it is known that the bottom has been filled up for five feet below the opening of the hole 40 into the cavern 48.

Then, 25 four foot capsules 10 may be dropped, the bottom checked in a similar manner, and it would be found that the bottom again remains at 2,005 feet indicating that there was no filling, but that these capsules had fallen in the spaces formed between the eight foot capsules. The remaining 25 four foot capsules 10 are dropped and the bottom will be found at 2,000 feet, indicating that the cavity is filled. This process is illustrated in FIGURE 4.

The fluid can still pass through the openings between capsules since the capsules are still intact. At this point the six inch pipe 50 can be raised to 1,900 feet and 50 two foot capsules 10 dropped. The pipe 50 is then raised to 1,800 feet and the remaining 50 capsules 10 are dropped in a similar manner. The pipe 50 is then pulled from the hole 40 and the drill string 54 lowered with a rock bit 56 on the end. The pipe weight is placed on the capsules 10 to assure being wedged tightly before dissolution occurred, as shown in FIGURE 5. The weight thereof is repeatedly applied to the capsules until the bit will go no deeper. This assures that the capsules are wedged firmly in place.

As illustrated in FIGURE 6, the drill string is then removed from the hole and in this example operations are ceased for a 24 hour period during which the cement solidifies into a block 58. Then, fluid is pumped into the hole until the hole is filled to the top, indicating that the cavity has in fact been sealed. At this time, as indicated in FIGURE 7, the bit 56 is run back into the hole and a hole 60 bored through the cement block 58 which was formed by the capsules.

After the hole is drilled to 2,025 feet, well below the place where the difficulty was encountered, the pipe is pulled from the hole and a slurry of cement placed at the vicinity of the cavity with conventional cementing equipment to assure that the cavity is permanently plugged. The cement is drilled out and drilling is resumed with no further difficulty.

Many variations are encountered as to the type of zone which causes trouble, and accordingly many variations in the mixtures placed into the capsules can be used.

It will be understood that the above description of the present invention is susceptible to various modifications, changes, and adaptations, and the same are intended to be comprehended within the meaning and range of equivalents of the appended claims.

What is claimed is:
1. As an article of manufacture, a casing, said casing comprising, in combination:
   an elongate hollow center section;
   a closure member removably attached to each end of said center section, each said closure member having means engageable with said center section for fastening the closure member thereto, so that said center section and said closure members together define a closed casing, said center section and said closure members being formed of a water soluble material.
2. A casing as defined in claim 1, including means at both ends of said center section for removably securing said closure members thereto, at least one of said securing means being a screw thread, and wherein the fastening means on at least one of said closure members is a screw thread adapted to cooperate with said securing means which is a screw thread.
3. A casing as defined in claim 1 wherein said center section includes two elements threadedly secured together.
4. As an article of manufacture, a casing comprising an elongate hollow center section, a closure member removably connected to each end of said center section for defining therewith a closed casing, said closure members and the ends of said hollow center section on which they are mounted being provided with cooperable threads, said center section and said closure members being formed of a water soluble material.
5. A casing as defined in claim 4 wherein the threads on the ends of said center section are arranged to be cooperable so that it is possible to thread two center sections together.
6. A device for use in solving lost circulation problems and the like comprising, in combination:
   (a) a hollow casing of water soluble material including
      (1) an elongate hollow center section, and
      (2) two closure members, each closing an end of said section and each of said closure members being removably connected to said center section; and
   (b) a material filling said casing which hardens after first being contacted by a liquid.
7. A method of solving lost circulation problems during drilling, particularly those caused by large caverns and the like, comprising the steps of:
   (a) dropping a first group of soluble casings having a lost circulation material therein into the hole being drilled;
   (b) compressing the casings therein;
   (c) waiting for a period of time until the casings dissolve and the material at least partially solidifies; and
   (d) drilling a hole through said at least partially solidified material.
8. A method of solving lost circulation problems during drilling, particularly those caused by large caverns and the like, comprising the steps of:
   (a) removing the drill string from the hole being drilled;
   (b) dropping a first group of soluble casings having a lost circulation material filling into the hole, the casings being of a length which is of the same order of magnitude as, but smaller than the height of the cavern;
   (c) dropping at least one other group of similarly formed casings into the hole which are shorter than those of the first group;
   (d) inserting the drill string into said hole to contact and compress the casings therein;
   (e) waiting for a period of time until the casings dissolve and the material at least partially solidifies; and

(f) drilling a hole through said at least partially solidified material.

9. A method of solving lost circulation problems during drilling, particularly those caused by large caverns and the like, comprising the steps of:
(a) removing the drill string from the hole being drilled;
(b) dropping a first group of soluble casings having a lost circulation material filling into the hole, the casings being of a length which is of the same order of magnitude as, but smaller than the height of the cavern;
(c) dropping at least one other group of similarly formed casings into the hole which are shorter than those of the first group;
(d) inserting the drill string into said hole to contact and compress the casings therein;
(e) waiting for a period of time until the casings dissolve and the material at least partially solidifies;
(f) drilling a hole through said at least partially solidified material; and
(g) cementing over said at least partially solidified material to assure proper sealing.

10. A method of solving lost circulation problems during drilling, particularly those caused by large caverns and the like, comprising the steps of:
(a) removing the drill string from the hole being drilled;
(b) inserting a drop pipe in said hole to a depth just above the top of the cavern causing the problem;
(c) dropping a first group of soluble casings having a lost circulation material filling into said drop pipe, the casings being of a length which is of the same order of magnitude as the height of the cavern;
(d) dropping into said drop pipe at least one other group of similarly formed casings which are shorter than those of the first group;
(e) removing said drop pipe from said hole;
(f) inserting the drill string into said hole to contact and compress the casings therein;
(g) waiting for a period of time until the casings dissolve and the material at least partially solidifies; and
(h) drilling a hole through said at least partially solidified material.

References Cited by the Examiner

UNITED STATES PATENTS

| | | | |
|---|---|---|---|
| 221,830 | 11/79 | King | 220—4 |
| 768,564 | 8/04 | Ernst et al. | 102—21.8 |
| 1,393,311 | 10/21 | Pendelton | 166—117 |
| 1,434,460 | 11/22 | Tibbatts | 220—4 |
| 1,861,047 | 5/32 | Colton | 167—83 |
| 2,352,805 | 7/44 | Scheuermann et al. | 166—117 |
| 2,609,880 | 9/52 | Dyer | 166—117 |
| 2,768,693 | 10/56 | Hughes | 166—21 |
| 3,031,964 | 5/62 | Chesnut | 102—21.8 |
| 3,083,778 | 4/63 | Friedman et al. | 175—2 |

BENJAMIN HERSH, *Primary Examiner.*

CHARLES E. O'CONNELL, *Examiner.*